Figure 1:
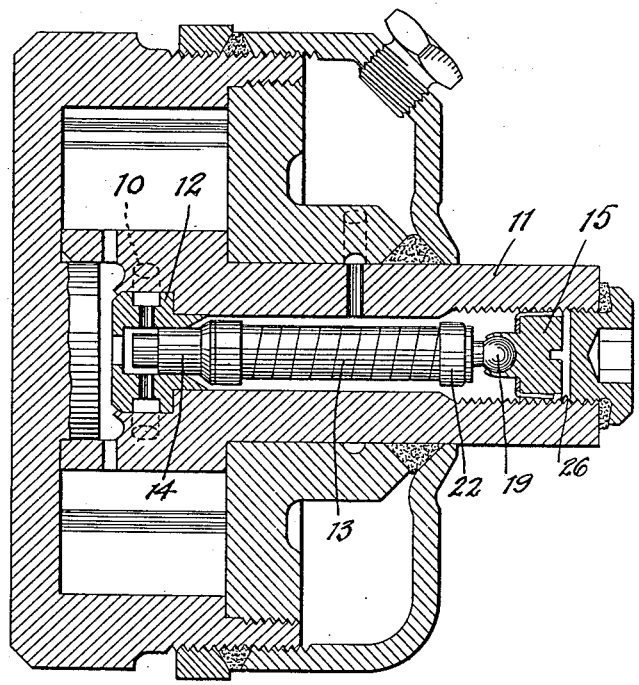

Sept. 11, 1934.  A. PETELER  1,972,949
THERMOSTATIC CONTROL DEVICE FOR HYDRAULIC SHOCK ABSORBERS Filed Dec. 30, 1932

INVENTOR
ADOLPH PETELER
BY
ATTORNEY

Patented Sept. 11, 1934

1,972,949

UNITED STATES PATENT OFFICE 1,972,949

THERMOSTATIC CONTROL DEVICE FOR HYDRAULIC SHOCK ABSORBERS

Adolph Peteler, Freeport, N. Y.

Application December 30, 1932, Serial No. 649,523

3 Claims. (Cl. 188—100)

My invention relates to hydraulic shock absorbers, and is concerned more particularly with thermostatic controls therefor.

In the manufacture of hydraulic shock absorbers of the so-called "Houde" type, it is next to impossible under existing manufacturing methods to obtain in all cases absolute or perfect alignment between the seat for the thermostatically controlled valve and the outer end of the bore, duct or chamber within which the thermostat is fitted. This is particularly true under quantity production methods where machining inaccuracies are bound to occur. Experience teaches that unless absolute accuracy is maintained, there is always present the possibility that some (usually the valve) part of the thermostatic assembly will "bind" or "stick" and hence fail to function as intended.

Prior to the present invention it has been the practice, in the manufacture of coil and other types of thermostats to effect rigidity or non-flexibility throughout the length of the thermostatic unit. That is to say, the actuator or adjusting member by means of which the thermostat, and hence the valve, is manually adjusted or set, the thermostat itself, and the valve member mounted at the inner thermostat end, have been so joined or united as to insure perfect tho rigid alignment. Such alignment, in and of itself, where the shock absorber per se is perfectly machined, is in no way objectionable. Trouble occurs, however, when and if a rigidly aligned thermostatic unit is fitted in an inaccurately machined shock absorber casing. In the latter case the binding or sticking tendency above referred to is bound to exist.

To attempt to alter existing shock absorber manufacturing practices in the interest of absolute accuracy is out of the question. To do so would so increase the manufacturing cost of hydraulic shock absorbers as to make the use thereof impracticable. On the other hand, it is entirely practical and feasible to alter slightly the structure of the shock absorber unit.

With the above in mind, it is a principal object of the present invention to so improve upon that type of thermostatic control disclosed in applications Serial Numbers 399,069, 502,642 and 554,487 filed November 16, 1929, December 16, 1930, and August 1, 1931, respectively, as to make the functioning of the control device, under all operating conditions, both perfect and dependable.

A further object of the invention is to so construct said thermostatic control device or unit as to admit of its use in perfect as well as in imperfect or inaccurately machined shock absorber casings.

A still further object of the invention is to provide a thermostatic control device in which certain of parts or portions thereof are flexibly united by means of a universal joint.

Other and further objects and advantages of the invention will be hereinafter set forth.

Figure 2:
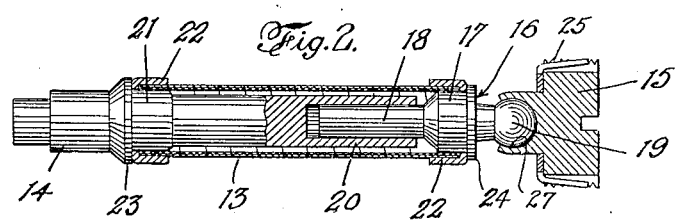

In the drawing:

Fig. 1 is a transverse vertical sectional view of a more or less standardized type hydraulic shock absorber having mounted thereon my improved type thermostatic control, and Fig. 2 is an enlarged view, partly in section and partly in elevation, of the thermostatic control.

The thermostatic control device or unit such as that herein referred to may be used on or in connection with any and all types of hydraulic shock absorbers. It is particularly designed, however, for use in association with hydraulic shock absorbers of the "Houde" type.

The so-called "Houde" shock absorber is a type of shock absorber now extensively used. Its construction and mode of operation are widely known to all persons skilled or conversant with the art. A general description of the construction and mode of operation of a shock absorber of the "Houde" type is set forth in application Serial No. 554,487 above referred to. As the present invention is in no way concerned with the shock absorber structure per se, a description thereof will not be here repeated. Suffice it to say that a cushioning liquid such as oil or glycerine is used.

To admit of the transfer of the cushioning liquid from one to the other side of the vanes of the shock absorber, a passage 10 is formed in the shaft 11 comprising a part of the shock absorber structure. Said passage 10 is more or less tortuous and is adapted to extend through and across a suitable hollow valve seat member 12, the hollow of which is open at one end to the bore or hollow of the shaft 11. It is within the hollow of said shaft 11 that the thermostatic control device is fitted (see Fig. 1).

The function of the control device is to automatically regulate or vary the effective area of the passage 10. Said device, in general, is not unlike the devices described in the pending applications above referred to. It comprises a longitudinally wound coil 13 formed from a continuous unitary strip of two layers of metal of different co-efficients of expansion, to the opposite ends of which a valve member 14 and an actuator or adjusting member 15 are respectively fastened.

Said valve member, however, instead of being rigidly fastened to said adjusting member, is fastened thereto, by means of said coil, in a manner admitting of its lateral swinging movement to an out-of-alignment position.

As previously intimated, considerable difficulty has been experienced in the manufacture of hydraulic shock absorbers in obtaining perfect alignment of the valve seat member with that part or portion of the shock absorber to which the adjusting member is attached. It is for this reason that the flexible joint above referred to is provided. Said joint is preferably located at the outer end of the coil or thermostat. The coil 13, at its outer end, is fastened to a member 16 provided with an enlarged intermediate bearing portion 17, a stem portion 18 and a ball-end 19. The stem portion 18 of said member is carried within the hollow of the coil and is adapted to telescopically engage in an extension 20 formed on the valve member 14. Like the member 16, the valve member 14, is also provided with an intermediate bearing portion 21, and it is over this bearing portion, as well as the bearing portion 17, that the opposite ends of the coil 13 are tightly fitted. Bands 22 encircle the ends of the coil to insure a positive connection. To limit the extent to which said members may be forced within said coil, flanges 23 and 24, one on each said member, are provided.

The actuator or adjusting member 15 is preferably exteriorly threaded as indicated at 25 for threaded engagement in the hollow of the shaft 11, said shaft, at its outer end, being interiorly threaded as at 26. Thus mounted, said member 15 is freely manually adjustable axially of said shaft, and, through its mechanical connection with the valve member 14, causes said member 14 to move axially relatively to its seat. The member 15 on its under side, is provided with a socket 27 within which the ball-end 19 of the member 16 is loosely fitted. The ball and socket joint thus established is in effect a universal joint and the valve 14 is accordingly permitted to automatically properly align itself relatively to its seat regardless of the fact that said seat and the rotation axis of said adjusting member may be slightly out of line. In other words, by the provision of the universal joint at the point indicated, all troubles, due to inaccurately machined shock absorber structures, are wholly and completely eliminated.

In fitting the telescopically engaging extensions 18 and 20 one within the other, care should be exercised to see that a loose fit is obtained and that a certain amount of axial play between the parts is provided. Said extensions, when properly fitted and assembled, serve to prevent the coil 13 from bending or buckling when stressed. Moreover, by shaping the valve at its inner end to fit firmly within the hollow of the valve seat, a support in the nature of a journal bearing for the valve and its assembly is provided.

In operation, the valve 14, as the coil 13 winds and unwinds due to temperature changes, moves relatively to its seat. As the temperature of the cushioning liquid increases, the valve is caused to turn and at the same time move inwardly, thereby restricting the flow of the cushioning liquid through the passage 10 to compensate for the decreased viscosity of said liquid in warm weather. On the contrary, as the temperature of the cushioning liquid falls off, the valve is caused to turn and move in a reverse direction to thereby compensate for the increased viscosity of the liquid in cold weather. In either case, the action of the coil, and hence the movement of the valve, is entirely automatic so as to render the operation of the shock absorber substantially uniform regardless of temperature conditions.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In a thermostatic control assembly for hydraulic shock absorbers, a coiled thermostat, a band encircling each end of said thermostat, a member fastened to said thermostat by its fitting engagement within one end of said coil, a member fastened to said thermostat by its fitting engagement with the other end of said coil, an extension formed upon each said member, said extensions being adapted to telescope one within the other within the embrace of said coil to prevent said coil from buckling, and a connection between one said member and the structure of the shock absorber.

2. For use in connection with a hydraulic shock absorber having formed therein an elongated chamber provided at its opposite ends with a valve seat member and with an adjusting member, respectively; a thermostatic valve comprising a valve member and a thermostatic coil, said valve member being centered by and slidable within the embrace of said valve seat member, and said thermostatic coil being fastened at one end to said adjusting member and at its opposite end to said valve member, the connection between said coil and said adjusting member being a swivel connection whereby said valve member may be accurately centered in its relation to and perfectly aligned with said valve seat member regardless of the fact that said adjusting member and said valve seat member may be disposed in out-of-alignment relation.

3. For use in connection with a hydraulic shock absorber having formed therein an elongated chamber provided at its opposite ends with a valve seat member and with an adjusting member, respectively; a thermostatic valve comprising a valve member and a thermostatic coil, said valve member being centered by and slidable within the embrace of said valve seat member, and said thermostatic coil being fastened at one end to said adjusting member and at its opposite end to said valve member; the connection between said coil and said adjusting member being a ball joint connection whereby said valve member may be accurately centered in its relation to and perfectly aligned with said valve seat member regardless of the fact that said adjusting member and said valve seat member may be disposed in out-of-alignment relation.

ADOLPH PETELER.